US011550768B1

(12) United States Patent
Poovathikkal et al.

(10) Patent No.: US 11,550,768 B1
(45) Date of Patent: Jan. 10, 2023

(54) METHODS AND SYSTEMS FOR A FAST ACCESS DATABASE AND FAST DATABASE MONITORING

(71) Applicant: Amazon Technologies, Inc., Seattle, WA (US)

(72) Inventors: Vineeth Chandran Poovathikkal, Bangalore (IN); Sangeeth Divakaran, Bangalore (IN); David John Edwards, Jr., Woodinville, WA (US); Jebaraj Moses, Coimbatore (IN); Sumit Kumar Sultania, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 16/867,271

(22) Filed: May 5, 2020

Related U.S. Application Data

(63) Continuation of application No. 15/377,415, filed on Dec. 13, 2016, now Pat. No. 10,783,126.

(51) Int. Cl.
  *G06F 16/21* (2019.01)
  *G06F 16/23* (2019.01)
  *G06F 11/30* (2006.01)
  *G06F 11/34* (2006.01)

(52) U.S. Cl.
  CPC ......... *G06F 16/217* (2019.01); *G06F 11/302* (2013.01); *G06F 16/2343* (2019.01); *G06F 16/2358* (2019.01); *G06F 16/2379* (2019.01); *G06F 11/3438* (2013.01); *G06F 2201/80* (2013.01); *G06F 2201/88* (2013.01)

(58) Field of Classification Search
  CPC .................................................... G06F 16/217
  See application file for complete search history.

(56) References Cited

U.S. PATENT DOCUMENTS

| | | | |
|---|---|---|---|
| 10,783,126 B1* | 9/2020 | Poovathikkal | G06F 11/302 |
| 2006/0230306 A1* | 10/2006 | Richards | G06F 11/076 |
| | | | 714/6.32 |
| 2007/0050777 A1* | 3/2007 | Hutchinson | G06F 11/0781 |
| | | | 718/104 |
| 2016/0364163 A1* | 12/2016 | Kamble | G06F 21/00 |
| 2017/0156115 A1* | 6/2017 | Yang | H04W 52/0254 |

* cited by examiner

*Primary Examiner* — Van H Oberly
(74) *Attorney, Agent, or Firm* — Eversheds Sutherland (US) LLP

(57) ABSTRACT

Systems, methods, and computer-readable media are disclosed for an improved database. The systems, methods, and computer-readable media described herein may enhance the response time of databases and improve user experiences. In an example method described herein, a database monitoring system may receive instructions to perform one or more data monitoring operations comprising counting an occurrence of a first value within at least a portion of items stored in a database. The method may include determining a length of a first window of time and fetching, from a first location of a data store of the database, data indicative of a total count of the occurrence of the first value at a time associated with the beginning of the first window of time. In turn, the monitoring system may store data representing the first count in the first memory.

20 Claims, 9 Drawing Sheets

METHODS AND SYSTEMS FOR A FAST ACCESS DATABASE AND FAST DATABASE MONITORING

CROSS-REFERENCE TO RELATED APPLICATION

This application is a continuation of U.S. application Ser. No. 15/377,415, filed Dec. 13, 2016, which is hereby incorporated by reference in its entirety.

BACKGROUND

Users and businesses may store information in a variety of databases having different structures. The users and businesses may update the information stored in such databases periodically. Similarly, users and businesses may retrieve information stored in such databases by providing search parameters (e.g., a search query) or the like. In many cases, storing and retrieving data may be time consuming and resource intensive. Other operations may include monitoring operations, such as counters and the like. Such operations may slow down the response time of the database and/or increase the operational costs.

Naturally, the ability to perform the operations described above in a faster and more efficient manner can significantly enhance the response time of databases. In turn, this may reduce the associated maintenance and management costs of the database while enhancing the user experience and satisfaction. Accordingly, there exists a dire market need for systems and methods that can enhance the performance of databases.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for accessing and monitoring databases, and in particular reducing computational loads on databases and improving their response time.

Generally, a database may include memory devices for use in conjunction with a database data structure to store and/or retrieve data onto and/or from the database. In one implementation, the data structure may be, for example, non-relational database (e.g., NoSQL database and/or dynamo database and/or the like). The memory devices may include high speed memory (e.g., RAM) and/or a low speed memory (e.g., a hard drive). Naturally, the memory may be volatile or non-volatile memory. While non-volatile memory operates at a slower speed, data may be safely stored on non-volatile memory without the non-volatile memory being powered (e.g., turned off). To the contrary, volatile memory operates at a higher speed but does not preserve the stored data when the volatile memory is not powered (e.g., turned off). The present disclosure describes systems and methods for efficiently utilizing volatile and non-volatile memory, of the databases and/or supporting monitoring systems, to enhance the performance of databases.

In one implementation, a database and/or a monitoring support system may include a counter 102. In one implementation, the counter may be an atomic counter. An atomic counter may use an update operation to increment or decrement a value of an existing attribute without interfering with other requests. In one example, the counter may monitor (e.g., count) a number of visitors to a website. With each consecutive visitor the value may be incremented using the update operation.

Figure 1A:
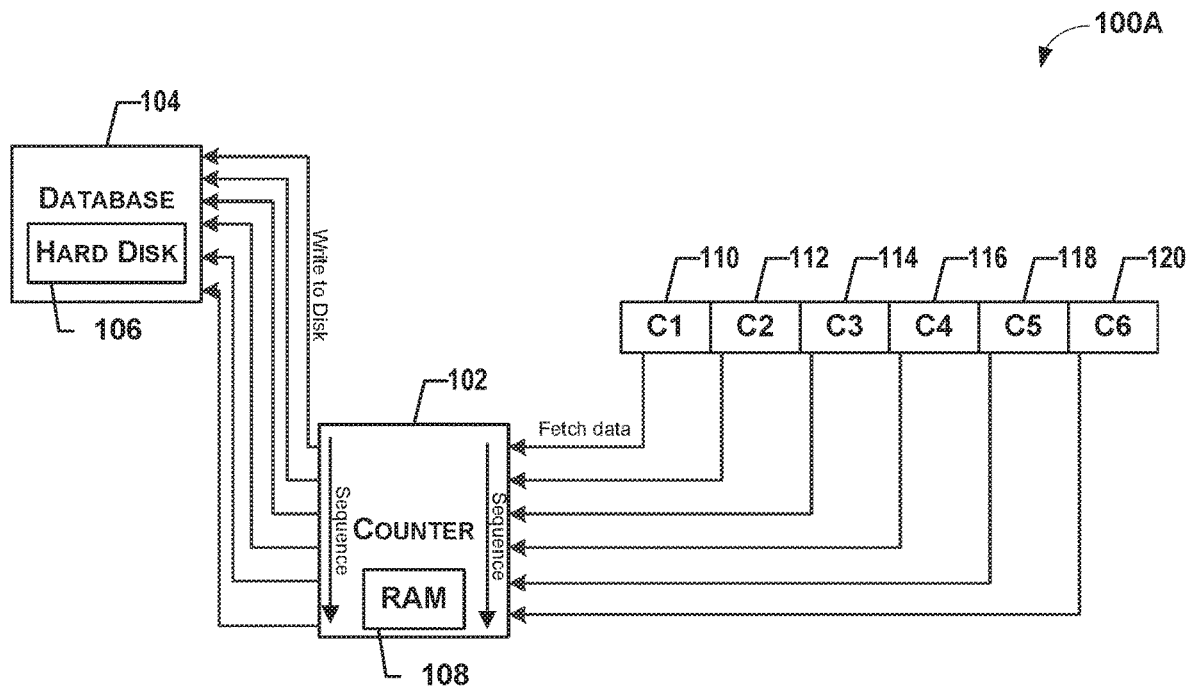
FIGS. 1A-3 illustrate a database and a database monitoring process in accordance with one or more example embodiments of the disclosure.

FIG. 1A illustrates interactions between a counter 102 and a database 104 in accordance with one or more embodiments of the disclosure. The counter 102 may be an atomic counter as described. In one embedment, the counter 102 may include RAM 108 and/or other types of memory as described herein. Elements C1-C6 110-120 represent various changes and/or updates to the count. In one implementation, data associated with C1 110 may be fetched. In one implementation, the data associated with C1 110 may be fetched from database 104 via a read operation. In a different implementation, the data associated with C1 110 may be fetched from a different database (not shown) via a read operation. For example, the counter 102 may fetch a current count and data representing changes to the current count. The counter 102 may store the current count and the data representing changes to the current count in RAM 108. In turn, the counter 102 may determine an updated count. In one implementation, the counter 102 may provide data representing the updated count to database 104. In turn, the database 104 may store the updated count onto hard disk 106 or a data store.

Similarly, data associated with C2 112 may be fetched by counter 102. The data associated with C2 112 may be data including the current count and changes to the current count. In one implementation, the current count may be determined based on the updated count stored in database 104 and/or hard disk 106. The counter 102 may store the current count and the data representing changes to the current count in RAM 108. In turn, the counter 102 may determine an updated count. In one implementation, the counter 102 may provide data representing the updated count to database 104.

In turn, the database 104 may store the updated count onto hard disk 106 or a data store.

A similar process may be repeated for C3 114, C5 118 and C6 120. As described herein, C1 110 may represent a first change in the count, C2 112 may represent a second change in the count, C3 114 may represent a third change in the count, C4 116 may represent a fourth change in the count, C5 118 may represent a fifth change in the count, and C6 120 may represent a sixth change in the count. Note that each change from changes C1-C6 110-120 may be associated with a unique fetching operation and a unique write operation. For example, count updates associated with C1 110 may comprise fetching data associated with C1 and writing an updated count to data base 104 and/or hard disk 106 Similarly, count updates associated with C2 112 may comprise fetching data associated with C2 and writing an updated count to data base 104 and/or hard disk 106. In one example, count updates associated with C1-C6 110-120 may include six fetch operations and six write operations, as each updated count is performed independently from other updated counts. This may cause the database 104 to experience a high level of stress and/or computational load. In turn, this may slow down the performance of the database 104 and degrade the user experience.

Figure 1B:
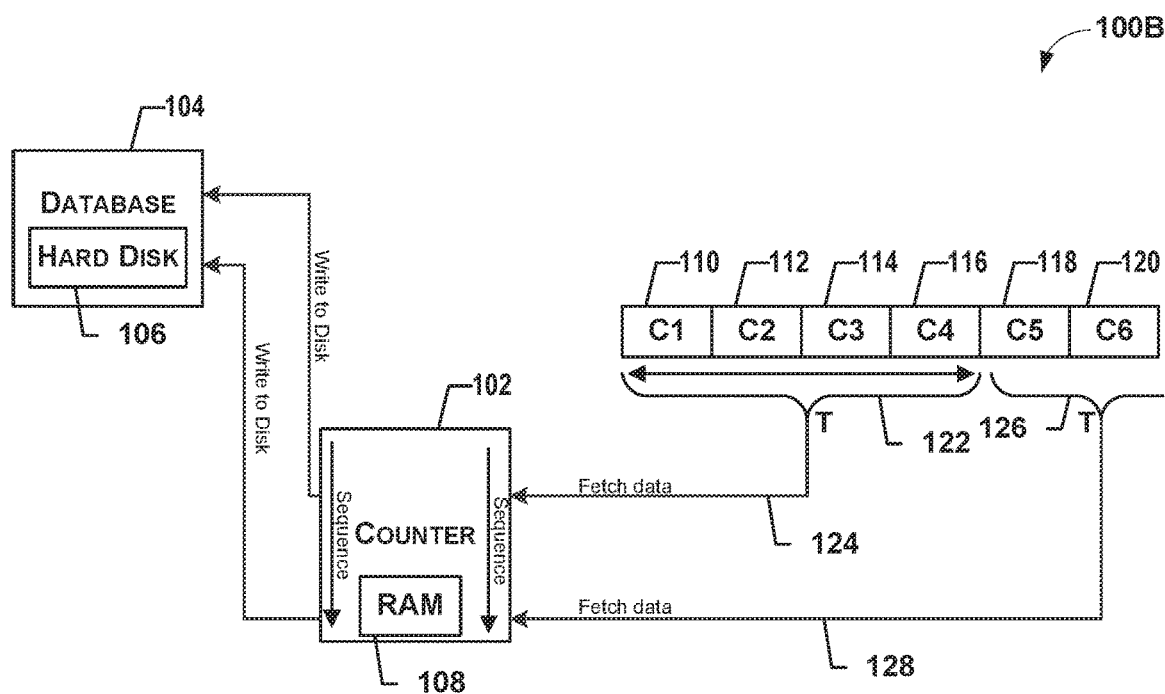

FIG. 2A illustrates interactions between a counter 102 and a database 104 in accordance with one or more embodiments of the disclosure. In the depicted embodiment of FIG. 1B, counter 102 may be an atomic counter as described. In one embedment, the counter 102 may include RAM 108 and/or other types of memory as described herein. Elements C1-C6 110-120 represent various changes and/or updates to the count. In one implementation, the counter 102 may define a period T 122. In one implementation, the counter 102 may receive the period T 122 or data representing the period T 122. In one implementation, the counter 102 may fetch the period T 122 or data representing the period T 122 from database 104 and/or hard drive 106 and/or RAM 108 and/or a remote data store. The period T 122 may define a window of time T where updates to the count are stored in RAM 108. In one implementation, updates to the counter may not be provided to or stored at database 104 and/or hard disk 106 during the window of time T or during the period T 122.

During the window of time T, the counter 102 may fetch data associated with C1 110 and store the data in RAM 108. The counter 102 may determine an updated count based on the fetched data associated with C1 110. The updated count may then be stored in RAM 108. In one implementation, the updated count may not be stored in database 104 and/or hard disk 106. The counter 102 may then fetch data associated with C2 112 and determine an updated count based on the data associated with C2 112. The updated count may then be stored in RAM 108. In one implementation, the updated count may not be stored in database 104 and/or hard disk 106.

Similarly, the counter 102 may then fetch data associated with C3 114 and determine an updated count based on the data associated with C3 114. The updated count may then be stored in RAM 108. In one implementation, the updated count may not be stored in database 104 and/or hard disk 106. In turn, the counter 102 may then fetch data associated with C4 116 and determine an updated count based on the data associated with C4 116. The updated count may then be stored in RAM 108. In one implementation, the updated count may not be stored in database 104 and/or hard disk 106.

The counter 102 may determine that the window T 122 expired. In one implementation, once the counter determines that the window T 122 is expired, the counter may provide a latest updated count to database 104. In one implementation, the latest updated count may be based at least in part on C1 110, C2 112, C3 114 and C4 116. In one implementation, updated count based, at least in part, on the data associated with C4 116 may be fetched from RAM 108 and provided to database 104 for storage onto hard drive 106 via a write operation.

In one implementation, a second period T 126 may be equal to period T 122. The period T 126 may form a second window of time T. During the second window of time T, the counter 102 may fetch data associated with C5 118 and store the data in RAM 108. The counter 102 may determine an updated count based on the fetched data associated with C5 118. The updated count may then be stored in RAM 108. In one implementation, the updated count may not be stored in database 104 and/or hard disk 106. The counter 102 may then fetch data associated with C6 120 and determine an updated count based on the data associated with C6 120. The updated count may then be stored in RAM 108. In one implementation, the updated count may not be stored in database 104 and/or hard disk 106. Once the period T 126 expires and/or the second window T expires, the counter 102 may provide a latest updated count to database 104. In one implementation, the latest updated count may be based at least in part on C5 118, C6 120 and/or the like. In one implementation, the updated count may be fetched from RAM 108 and provided to database 104 for storage onto hard drive 106 via a write operation. The process described may be repeated with a plurality of periods T and/or windows of time.

In some implementations, the periods T 122 and T 126 may be dynamically adjusted. In one example, the counter 102 and/or database 104 determine that the database 104 is experiencing a high computational load. For, example, the counter 102 and/or database 104 may determine that the database 104 is experiencing a high computational load based on the computational load exceeding a threshold and/or the response time of the database exceeding a second threshold. In response, the counter 102 may increase the period T 122, for example to include C1 110, C2 112, C3 114, C4 116, and C5 118. This may reduce the overall number of write operations to database 104 or hard disk 106.

In one implementation, the processing speed of each processing core of the database may be calculated. A throughput may be calculated for all or some of the cores of the database. In one example, the throughput may be the speed of processing of each core of an average size of the data associated with each item in the database. In turn, the throughput may be used to determine a dynamic size of the period T 122 and/or the period T 126. In some implementations, other performance metrics may be monitored and used to adjust the dynamic period T. Other performance metrics may for example include the speed of processing, the cost associated with processing and/or the like.

Figure 2:
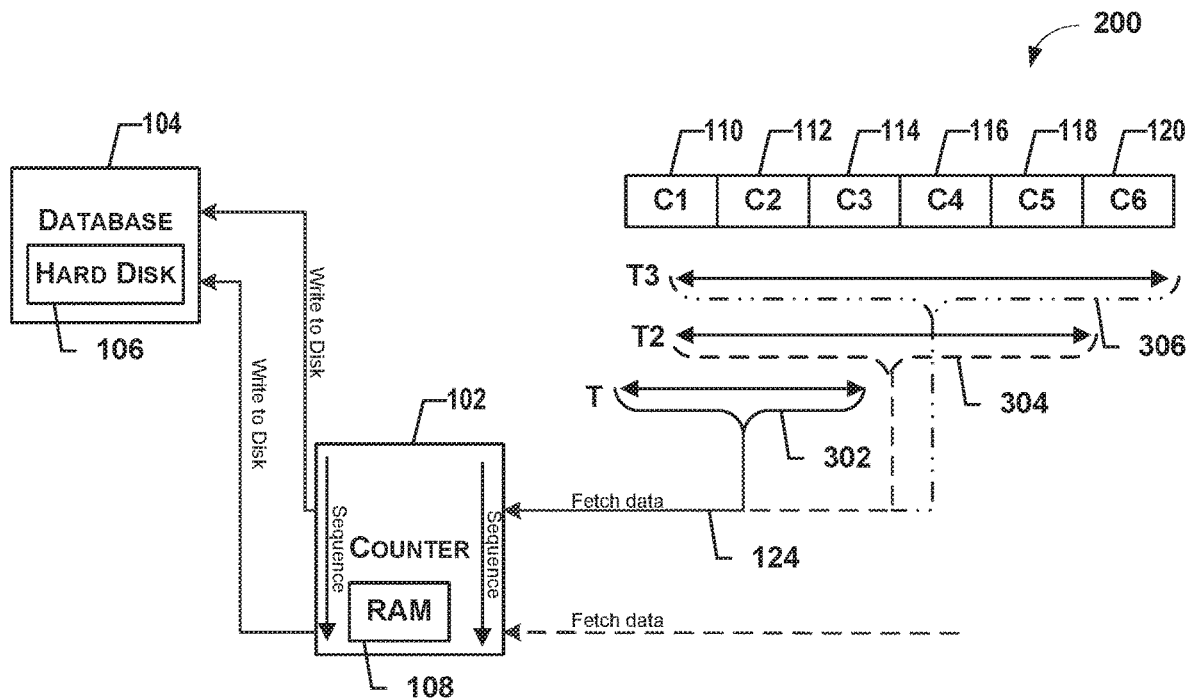

FIG. 2 illustrates interactions between a counter 102 and a database 104 in accordance with one or more embodiments of the disclosure. The counter 102 may be an atomic counter as described. In one embedment, the counter 102 may include RAM 108 and/or other types of memory as described above. Elements C1-C6 110-120 represent various changes and/or updates to the count. The operations associated with FIG. 2 are generally similar to the operations discussed above with reference to FIG. 1B. However, the window of time T or the period T may be adjusted dynamically. In one example, the window of time T or the period T may be represented by element 302. Element 302, shows a window of time T or a period T that spans three updates (e.g., 1 second, 2 seconds, 5 seconds and/or the like). Therefore, updates based on C1 110-C3 114 may be calculated consecutively by the counter 102 and saved into RAM 108. Once the window of time T or period T 302 expires, the counter 102 may fetch data corresponding to the updated count and provide the data to database 104 for storage at hard disk 106 via a single write operation.

In one implementation, the window of time T2 or period T2 may be represented by element 304. In one example, the counter 102 may adjust the window of time T2 or period T2 from element 302 to element 304. In one example, the adjustment may be based on the database 104 experiencing a computational load and/or stress that exceeds a first threshold. As depicted, the window of time T2 or period T2 304 may span C1 110-C5 118. Accordingly, updates based on C1 110-C5 118 may be calculated consecutively by the counter 102 and saved into RAM 108. Once the window of time T2 or period T2 304 expires, the counter 102 may fetch data corresponding to the updated count and provide the data to database 104 for storage at hard disk 106 via one or more write operations.

In one implementation, the window of time T3 or period T3 may be represented by element 306. In one example, the counter 102 may adjust the window of time T3 or period T3 from element 302 and/or element 304 to element 306. In one example, the adjustment may be based on the database 104 experiencing a computational load and/or stress that exceeds a first threshold. As depicted, the window of time T3 or period T3 304 may span C1 110-C6 120. Accordingly, updates based on C1 110-C6 120 may be calculated consecutively by the counter 102 and saved into RAM 108. Once the window of time T3 or period T3 306 expires, the counter 102 may fetch data corresponding to the updated count and provide the data to database 104 for storage at hard disk 106 via one or more write operations.

In one implementation, a second consecutive window of time T may follow the window of time T 302. In one implementation, a second consecutive window of time T2 304 may follow the window of time T 302. In one implementation, a second consecutive window of time T3 306 may follow the window of time T 302. As described herein the length of the window of time or period may be adjusted dynamically based on, for example, the computational load or stress of the operating server and/or database.

In some implementations, the counter 102 may apply simple and/or complex logic to determine counts that are based on more than one attribute and/or value. In one implementation, a plurality of counters may be configured to count different values and/or attributes within database 104. For example, a first counter may count a number of visits to a first website, while a second counter may count a number of visits to a second website.

Figure 3:
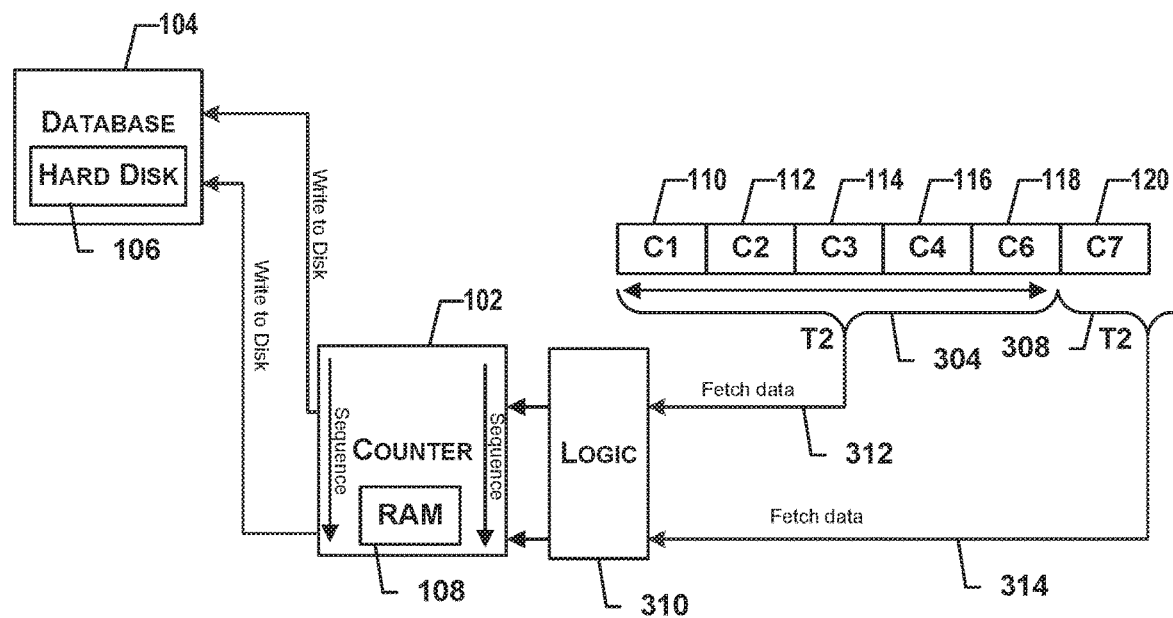

FIG. 3 illustrates interactions between a counter 102 and a database 104 in accordance with one or more embodiments of the disclosure.

In the depicted embodiment, the counter 102 may be an atomic counter as described. In one embedment, the counter 102 may include RAM 108 and/or other types of memory as described above. Elements C1-C6 110-120 represent various changes and/or updates to the count. The operations associated with FIG. 2 are generally similar to the operations discussed above with reference to FIG. 1B. However, the window of time T2 or the period T2 312 is selected in the depicted embodiment. In the depicted embodiment, the window of time T2 304 is followed by the window of time T2 308. As depicted, the window of time T2 304 may span C1 110-C5 118. Accordingly, updates based on C1 110-C5 118 may be calculated consecutively by the counter 102 and/or logic device 310 and, in turn, saved into RAM 108. Once the window of time T2 or period T2 304 expires, the counter 102 may fetch data corresponding to the updated count and provide the data to database 104 for storage at hard disk 106 via one or more write operations. The process may be repeated for the window of time T2 308.

The logic device 310 may be a standalone device or a device embedded into counter 102. The logic device 310 may facilitate counting of data of a composite data type (e.g., composite data). Composite data may be data that is formed by multiple primitive data types. Primitive data may be data types that may for example include characters, single precision integers, double precision integers, Boolean values, references, tuples and/or the like. In one example, composite data may be data determined based on multiple double precision integers and Boolean values. For example, a website for an online retailer services may provide a limited number of coupons for redemption on first come first serve basis. The coupons may be for a particular product (e.g., 30-inch monitor). In one example, only the first thousand customers may be eligible to receive and/or redeem a coupon. Customers may be able to add items from the online retailer to a shopping cart. A limited number of customers (e.g., 1000) may be allowed to be placed on a waiting list for the coupons while other customers are completing their transactions. Some customers may not complete their transaction. For example, a customer may empty his respective cart. Accordingly, a coupon reserved for that customer may be free to provide to a different customer from the waiting list.

In the depicted example, a counter 102 and/or logic device 310 may be responsible for counting a number of customers that currently added the particular product to their respective carts, the number of purchases of the particular product that redeemed the coupon, and a number of customers currently in the waiting list. In one implementation, counter 102 may utilize a first sub-counter (not shown) count a number of customers that currently added the particular product to their respective carts, a second sub-counter (not shown) may count the number of the particular product that was purchased in association with redemption of the coupon, and a third sub-counter (not shown) may count a number of customers currently in the waiting list.

The logic device 310 may enforce one or more strategies in association with the counts described above. In one example, a user device (not shown) may provide the one or more strategies to the logic device 310 and/or counter 102. For example, as a user completes a transaction the first sub-counter and the second sub-counter may be incremented. In one example, as the count of redeemed coupons and the waiting list count meets the maximum number of customers that are allowed to redeem the coupon (e.g., 1000), the logic device 310 may provide instructions to the retail service to prevent additional customers from joining the waiting list. In turn, when a customer that added the product to their cart fails to complete the transaction, a first customer from the waiting list may be allowed to redeem the coupon. Accordingly, the first sub-counter may be decremented and the third counter may also be decremented. In turn, the logic device 310 may provide instructions to the retail service to allow an additional user to join the waiting list and to allow an additional user to redeem a coupon. The logic device may also perform operations to determine complex type counts. In one example, a fourth sub-counter may be responsible for counting a number of visitors to the retailer website. In one implementation, the logic device 310 may divide the sum of the count from the first sub-counter, the count from the second sub-counter and the count from the third sub-counter over the count from the fourth sub-counter to determine a total percentage of the website visitors that are interested in the product. Similar logic may also be implemented using logic device 310. As described herein, a user (e.g., employee of the retail service), may provide custom logic and strategies for implementation by logic device 310. In turn, the logic device 310 may enforce the custom logic and strategies provided.

Illustrative Device Architecture

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Example Counting Engine and Database

Figure 4:
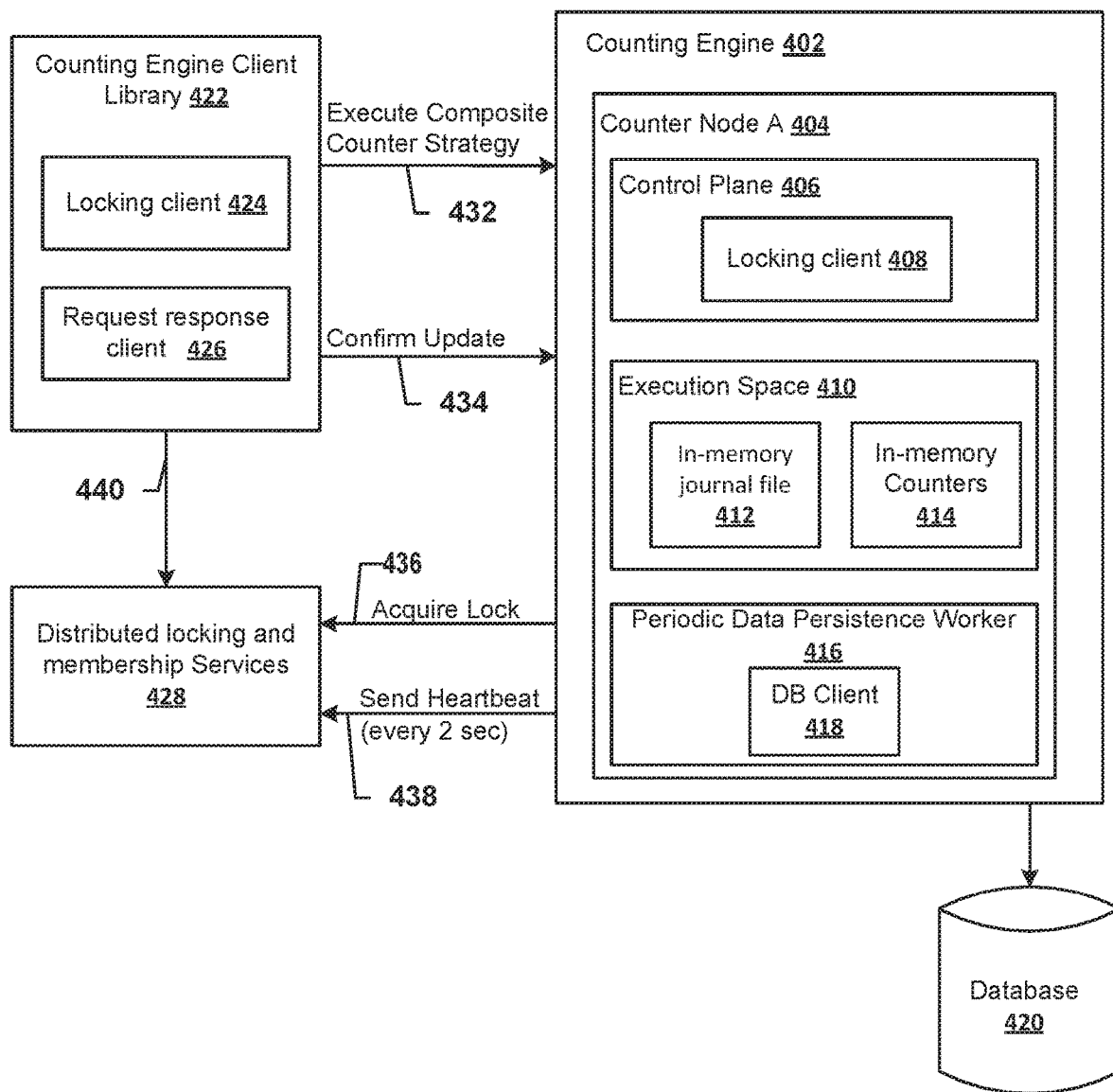
FIG. 4 illustrates an example schematic diagram of a database and a database counting engine in accordance with one or more example embodiments of the disclosure.

FIG. 4 depicts a counting engine 402 in communication with database 420. The database 420 may be a Daynmo database or a DaynmoDB. A DynamoDB may be a fully managed NoSQL database service that provides fast performance with scalability. The DynamoDB may allow offloading administrative burdens of operating and scaling a distributed database. For example, a service database services associated with the DynamoDB may include hardware provisioning, setup and configuration, replication, software patching, or cluster scaling.

In one example, a user may interact with the database to create database tables that can store and retrieve any amount of data, and serve any level of request traffic. The user may also interact with the database to scale up or scale down tables' throughput capacity without downtime or performance degradation. In some examples, the user may interact with a monitoring system to monitor resource utilization and performance metrics, as described herein.

The database may automatically spread data and traffic for a user's tables over a sufficient number of servers to handle the user's throughput and storage requirements, while maintaining consistent and fast performance. The user data may be stored on one or more disks. In one example, the user data is stored on solid state disks (SSDs) and automatically replicated across multiple sectors, providing built-in high availability and data durability.

The counting engine 402 may include one or more counter nodes. For example, the counting engine 402 may include a counter node A. In one implementation, the counting engine 402 may include a counter node B (not shown). Each counting node may be designated to monitor and count particular occurrences. In one example, counter node A 404 may be assigned to perform one or more counts associated with a retailer service. In one example, counter node B (not shown) may be assigned to perform one or more counts associated with a car manufacturer. In one example, the counter node B 404 may be assigned to perform count visitors to a retailer service website. In one example, the counter node B 404 may be assigned to count customers of the retailer service that redeemed a particular coupon. Each counting node may comprise one or more computing devices, processors, volatile and non-volatile memories and/or the like.

The counting node may further include a control plane 406. The control plane 406 may be responsible for routing data respective counter nodes. In one example, the control plane may route data associated with a first count to a first sub-counter of counter node A 404 and data associated with a second count to a second sub-counter of counter node A 404. The control plane 406 may include a locking client 408. The locking client 408 may lock portions (e.g., one or more tuples) of database 420 designated for storing the first count when, for example, counter node A 404 is assigned to update the first count. For example, the locking client may provide instructions to database 420 to prevent writing of data to the portion of the database 420 designated for storing the first count. In turn, the locking client 408 may provide instructions to database 420 to allow writing of data to the portion of the database 420 designated for storing the first count, after counter node A 404 updates the first count. In one example, the locking client 408 may provide instructions to database 420 to allow writing of data to the portion of the database 420 designated for storing the first count, when counter node A is no longer assigned to update the first count. For example, when counting engine 402 experiences a failure, assignment to update the first count may be removed from counting engine 402.

In some implementations, the counter node A 404 may include an execution space 410. Execution space 410 may include one or more computing devices, processors, volatile and non-volatile memories and/or the like. For example, the execution space may be configured for calculating updates to counts (e.g., the first count). Updated counts may be calculated at execution space 410 and saved onto in-memory counters 414 (e.g., RAM). The Execution space 410 may also be configured to monitor the performance of database 420 and store information associated with the performance of database 420 into in-memory journal file 412. In one example, the in-memory journal file may be a log that records system crashing events, power failure events, over heating events, low throughput events and/or the like.

In one example periodic data persistence worker 416 may be responsible for facilitating communications with database 420. In one implementation, the periodic data persistence worker 416 may insure that data in memory counters 414 is preserved until the data from in-memory counters 414 is recorded onto database 420. In one implementation, the periodic data persistence worker 416 may include a database client 418. The database client may facilitate communications between Counting engine 402 and database 420. In one example, the database client 418 may be configured to use a connection between database 420 and counting engine 402 to provide commands to the database 420 and receive replies from the database 420.

In some implementations, a counting engine client library 422 may be in data communication with counting engine 402. The counting engine client library 422 may include one or more computing entities, processors, volatile and non-volatile memory and/or the like. The counting engine client library 422 may include a locking client 424. The locking client 424 may be in communication with the locking client 408 to coordinate assignment of count operations to counter node A 404. In one implementation, counting engine client library 422 may execute composite counter strategy 432. Similarly, the counting engine client library 422 may provide instructions to counting engine 402 to execute composite counter strategy 432. The counting engine client library 422 may also provide a confirm update data 434 indicative of assignment of the counting engine 402 to update the first count. The counting engine client library may include a request response client 426 configured to facilitate providing responses to locking requests. For example, the request response client 426 may be responsible for providing data 434 confirming one or more updates. The counting engine client library 422 may provide data 440 indicative of a current assignment of various count updates to various counting engines. For example, the data 440 may include data indicative of the first count being assigned to the counter node 404 and/or counting engine 402.

In some implementations, distributed locking and membership service 428 may include information associated with locking and assignments of counts and/or count updates to counting engines and/or counting nodes. In one implementation, the distributed locking and membership service 428 may be responsible for managing locking operations, membership data, and counter nodes assignment. The distributed locking and membership service 428 may receive and store membership data of users. In one example, the distributed locking and membership service 428 may store data in association with user accounts, the data may define respective user privileges associated with respective accounts. For example, an overall maximum storage capacity may be allocated to a user account. In one implementation, the distributed locking and membership service 428 may receive from counting engine 402, a heartbeat signal 438. In one example, the heart beat signal 438 may be sent periodically. For example, the heartbeat signal may be sent every 2 seconds, 1 second, 4 seconds and/or the like. The distributed locking and membership service 428 may also receive acquire lock data 436. The acquire lock data 436 may include a request to assign a count and/or a count update to a particular count engine and/or counter node. For example, the acquire lock data 436 may be a request to assign the first count to counter node A 404. Once the assignment is complete, the counting engine client library 422 may provide confirm update data 434 to counting engine 402. The confirm update data 434 may include data indicative of assignment of the first count to counter node A 404. In one example, the confirm update data 434 may be transmitted via a Transmission Control Protocol (TCP) and/or the like.

Computing Device

Figure 5:
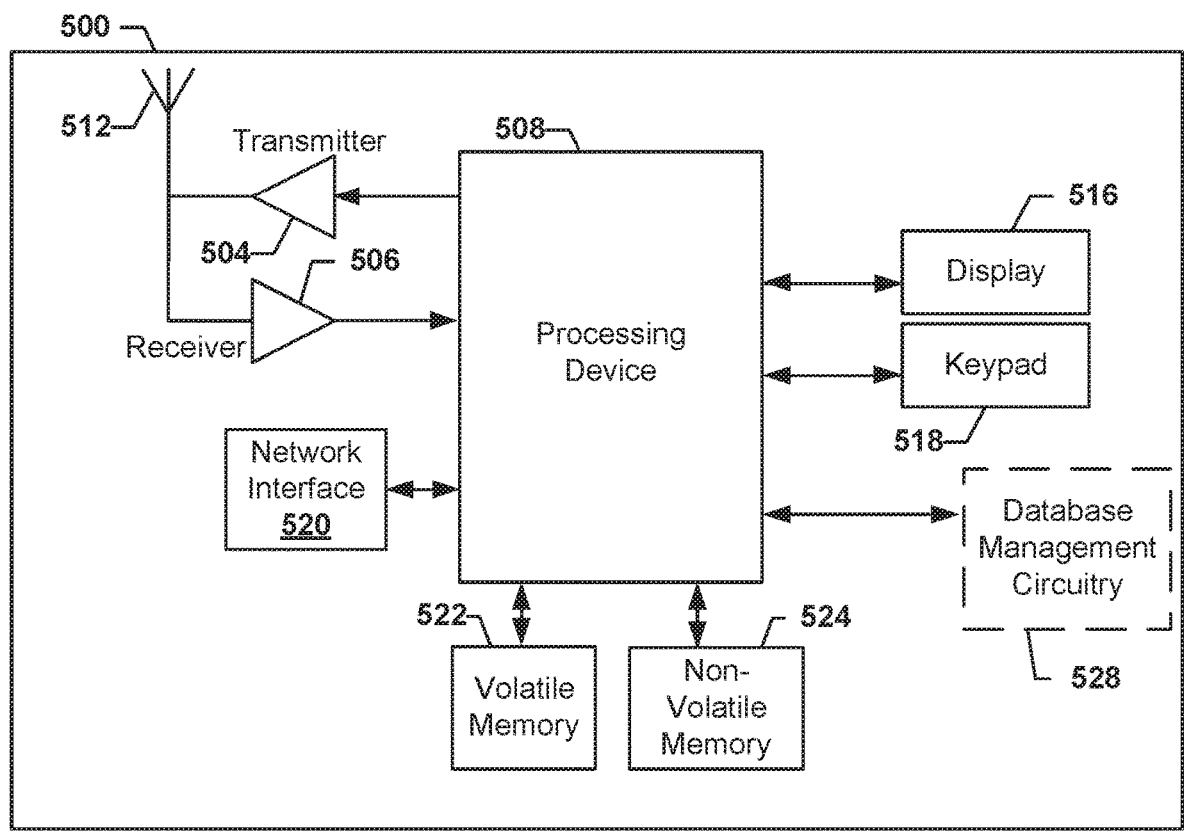
FIG. 5 illustrates an example schematic diagram of a computing device according to one or more example embodiments of the disclosure.

FIG. 5 illustrates an example schematic diagram of a computing device 500 and/or entity according to one or more example embodiments of the disclosure. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The computing device 500 can be operated by various parties and/or automatically. As shown in FIG. 5, the computing device 500 can include an antenna 512, a transmitter 504 (e.g., radio), a receiver 506 (e.g., radio), and a processing device 508 (e.g., CPLDs, microprocessors, multi-core processors, co-processing entities, ASIPs, microcontrollers, and/or controllers) that provides signals to and receives signals from the transmitter 504 and the receiver 506, respectively.

The signals provided to and received from the transmitter 504 and the receiver 506, respectively, may include signaling information in accordance with air interface standards of applicable wireless systems. In this regard, the computing device 500 may be capable of operating with one or more air interface standards, communication protocols, modulation types, and access types. More particularly, the computing device 500 may operate in accordance with any of a number of wireless communication standards and protocols. In a particular embodiment, the computing device 500 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 500 may operate in accordance with multiple wired communication standards and protocols, via a network interface 520.

Via these communication standards and protocols, the computing device 500 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 500 can also download changes, add-ons, and updates, for instance, to its firmware, software (e.g., including executable instructions, applications, program modules), and operating system.

According to one embodiment, the computing device 500 may include location determining aspects, devices, modules, functionalities, and/or similar words used herein interchangeably. For example, the computing device 500 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 500 position in connection with a variety of other systems, including cellular towers, Wi-Fi access points, and/or the like. Similarly, the computing device 500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 500 may also comprise a user interface (that can include a display 516 coupled to a processing device 508) and/or a user input interface (coupled to a processing device 508). For example, the user interface may be a user application, browser, user interface, and/or similar words used herein interchangeably executing on and/or accessible via the computing device 500 to interact with and/or cause the display of information. The user input interface can comprise any of a number of devices or interfaces allowing the computing device 500 to receive data, such as a keypad 518 (hard or soft), a touch display, voice/speech or motion interfaces, or other input devices. In embodiments including a keypad 518, the keypad 518 can include (or cause the display of) the conventional numeric (0-9) and related keys (#, *), and other keys used for operating the computing device 500 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 500 can also include volatile memory 522 and/or non-volatile memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 500. As indicated, this may include a user application that is resident on the respective device or accessible through a browser or other user interface for communicating with various other computing entities. As will be recognized, these architectures and descriptions are provided for example purposes only and are not limited to the various embodiments.

The computing device 500 may optionally include database management circuitry 528. In one implementation, the database management circuitry 528 may be embodied as software executed on the processing device 508. In a different implementation, the database management circuitry 528 may be a processing device in communication with the processing device 508. The database management circuitry 528 may be responsible for managing one or more databases. In one implementation, the database management circuitry 528 may store and maintain a tree (e.g., b-tree and/or the like) in association with each database. For example, the tree may be used by the database management circuitry 528 to facilitate searching for data in the database 608 of FIG. 6. The database management circuitry 528 may receive and process search requests via the network interface 520 Similarly, referring to FIG. 6, the database management circuitry 528 may provide the search results to user devices 602A-602N and/or client devices 604A-604N. In some implementations, the server 610 may perform the operations described above with reference to the database management circuitry 528.

Database Management and Storage Service

As used herein, the term "database management and storage service" may include a service that is accessible via one or more computing devices and that is operable to receive data for storage onto one or more storage devices of the database management and storage service. The database management and storage service may also facilitate retrieval of data from the database storage devices. The data may be retrieved by the sorting entity/user device or by other entities or user devices. The stored data may be backed up in one or more additional storage devices to ensure that the data is preserved.

As used herein, the terms "client" and "storing entity" may be used interchangeably and may include, but are not limited to, a business owner, shopkeeper, tradesperson, vendor, operator, entrepreneur, agent, dealer, organization or the like that is in the business of providing a good, service or experience to a consumer, facilitating the provision of a good, service or experience to a consumer, and/or otherwise operating in the stream of commerce. The "client" and "storing entity" may also include individuals, households, and/or the like. As used herein, the terms "consumer" and "user" may be used interchangeably and may include, without limitation, individuals, groups of individuals, corporations, other merchants, and the like.

As used herein, the term "communication channel data" refers to electronic information relating to the particular device or communication channel upon which a client communicates with the database storage and management service. In this regard, communication channel data may include the type of device used by the client (e.g., smartphone, phone, desktop computer, laptop, netbook, tablet computer), the Internet Protocol (IP) address of the device, the available bandwidth of a connection, login credentials used to access the channel (e.g., a user account and/or password for accessing the database management and storage service), or any other data pertaining to the communication channel between the database management and storage service and an entity external to the database management and storage service.

Figure 6:
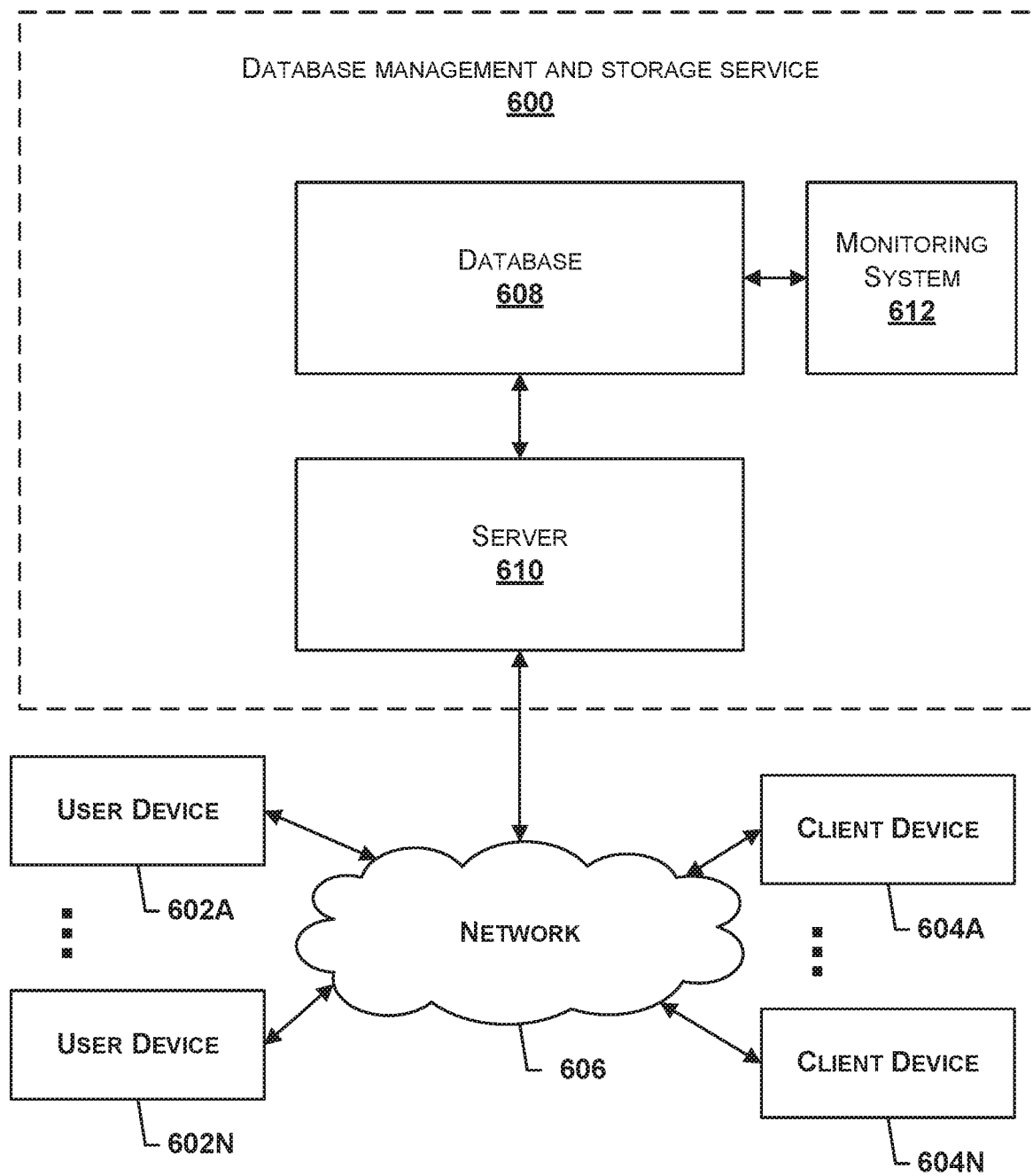
FIG. 6 illustrates an example environment at which one or more devices may operate according to one or more example embodiments of the disclosure.

FIG. 6 discloses an example database management and storage service 600 within which embodiments of the present disclosure may operate. Clients may access a database management and storage service 600 via a network 606 (e.g., the Internet or the like) using one or more user devices 602A-602N or one or more client devices 604A-604N. Moreover, the database management and storage service 600 may comprise a server 610 in communication with a database 608. Other communication channels may also be formed between the client devices 604A-604N, the user devices 602A-602N, the database management sand storage service 600 and/or the like.

The server 610 may be embodied as a computer or computers as described herein (e.g., computing device 500). The server 610 may provide for receiving electronic data from various sources including, but not necessarily limited to, the user devices 602A-602N or one or more client devices 604A-604N. For example, the server 610 may be operable to receive and process data provided by the client devices 604 for storage. Similarly, the server 610 may facilitate fetching of the stored data by the client devices 604 and/or the user devices 602. The server 610 may also track and log information associated with storage and retrieval for billing purposes. Such transaction data may be used to generate bills for clients at the server 610 or transferred via the network 606 to a different computing entity responsible for billing (not shown).

The database 608 may be embodied as a data storage device such as a Network Attached Storage (NAS) device or devices, or as a separate database server or servers. The database 608 includes information accessed and stored by the server 610 to facilitate the operations of the database management and storage service 600. For example, the database 608 may include, without limitation, user account credentials for system administrator privileges, access operations, data modifying operations and/or the like.

The user devices 602A-602N and the client devices 604A-604N may be any computing device as described above and operated by a user. Electronic data transferred between the server 610 and the user devices 602A-602N and the client devices 604A-604N may be provided in various forms and via various methods. For example, the user devices 602A-602N and the client devices 604A-604N may include desktop computers, laptop computers, smartphones, netbooks, tablet computers, wearables, and the like. The information may be provided through various sources on these devices.

In embodiments where a user device 602 or a client device 604 is a mobile device, such as a smartphone or tablet, the user device 602 or the client device 604 may execute an "app" to interact with the database management and storage service 600. Such apps are typically designed to execute on mobile devices, such as tablets or smartphones. For example, an app may be provided that executes on mobile device operating systems. These platforms typically provide frameworks that allow apps to communicate with one another and with particular hardware and software components of mobile devices. Communication with hardware and software modules executing outside of the app may be provided via application programming interfaces (APIs) provided by the mobile device operating system.

Additionally or alternatively, the user device 602 or the client device 604 may interact through the database management and storage service 600 via a web browser. As yet another example, the user device 602 or the client device 604 may include various hardware or firmware designed to interface with the database management and storage service 600 (e.g., where the user device 602 or the client device 604 is a purpose-built device offered for the primary purpose of communicating with the database management and storage service 600).

The database management and storage service may include a monitoring system 612. In one implementation, the monitoring system may monitor the database 608 and/or server 610. For example, the monitoring system 612 may monitor the speed of operation of the database and/or sectors of the database. In one example, the monitoring system 612 may monitor the heat generated by the database and/or sectors of the database.

The monitoring system 612 may also include one or more counters and/or counter nodes. The counters and/or counter nodes may be assigned to update one or more counts being stored onto database 608. In one implementation, the monitoring system 612 may include volatile memory (e.g., RAM). In one example, counting operations may be performed by the monitoring system 612 and stored, at least temporarily, in the volatile memory. This reduces the computational stress and/or heat generated by the database 608.

The monitoring system 612 may periodically fetch data from the volatile memory and provide to database 608 for storage, via a communication channel (e.g., bidirectional communication channel). In one example, the data may be fetched from the volatile memory and provided to database 608 for storage every period T (e.g., 1 second, 5 seconds, 10 seconds and/or the like. In one example, the period T may be adjusted dynamically based on one or more monitored performance metrics of the database 608. For example, as the heat generated by database 608 or portions of the database 608 exceeds a pre-determined threshold, the monitoring system 612 may increase the period T (e.g., increase the period T from 1 second to 5 seconds.) In one example, as the computational stress database 608 or portions of the database 608 exceeds a pre-determined threshold, the monitoring system 612 may increase the period T (e.g., increase the period from 2 seconds to 4 seconds.) Similarly, as the heat generated by database 608 or portions of the database 608 falls below a pre-determined threshold, the monitoring system 612 may decrease the period T (e.g., decrease the period T from 5 seconds to 3 seconds.) In one example, as the computational stress database 608 or portions of the database 608 falls below a pre-determined threshold, the monitoring system 612 may decrease the period T (e.g., decrease the period from 8 seconds to 4 seconds.)

Illustrative Processes

Figure 7A:
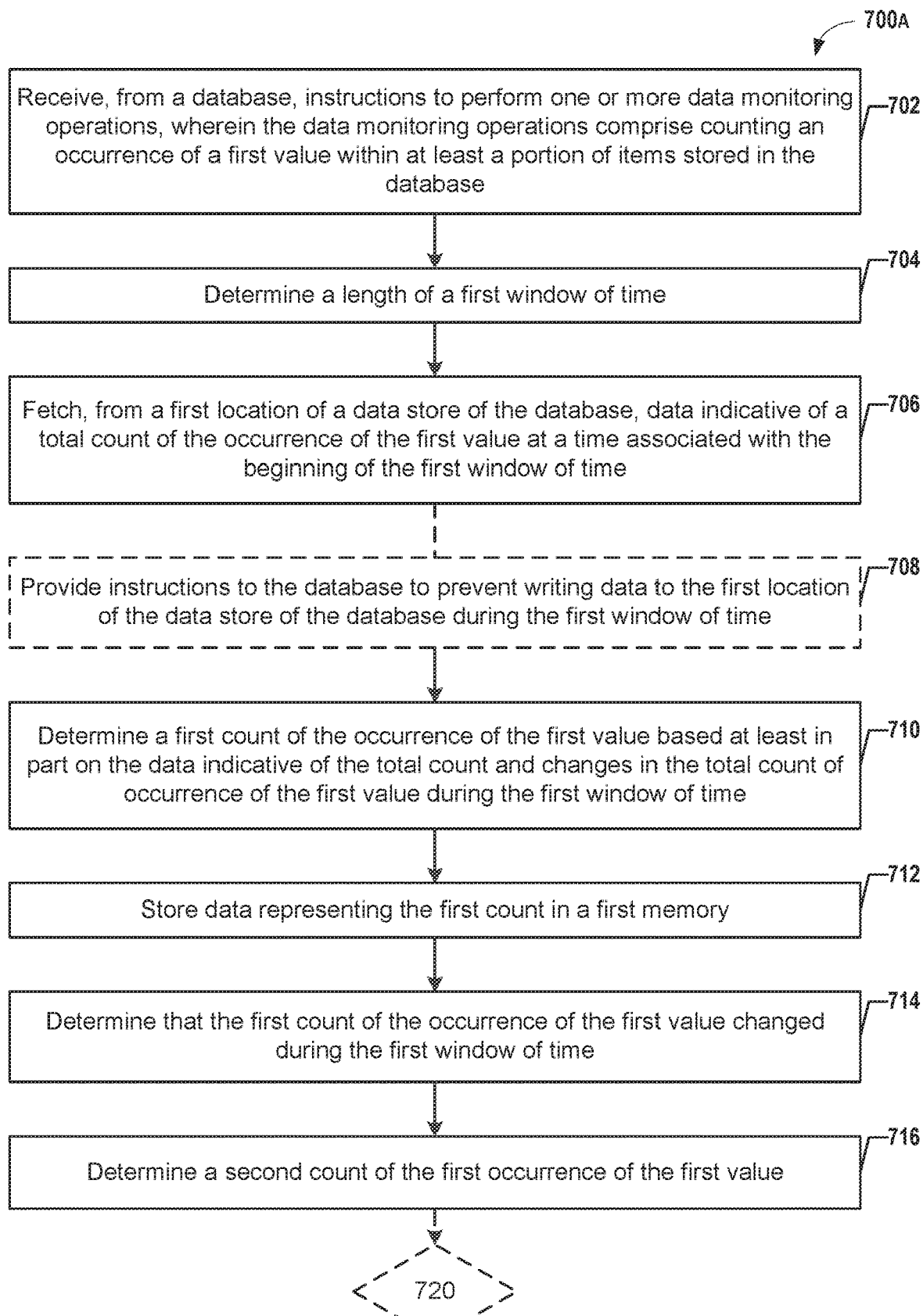
FIGS. 7A-7B and 8A-8B flowcharts illustrating various procedures and operations that may be completed in accordance with various embodiments of the disclosure.
Figure 7B:
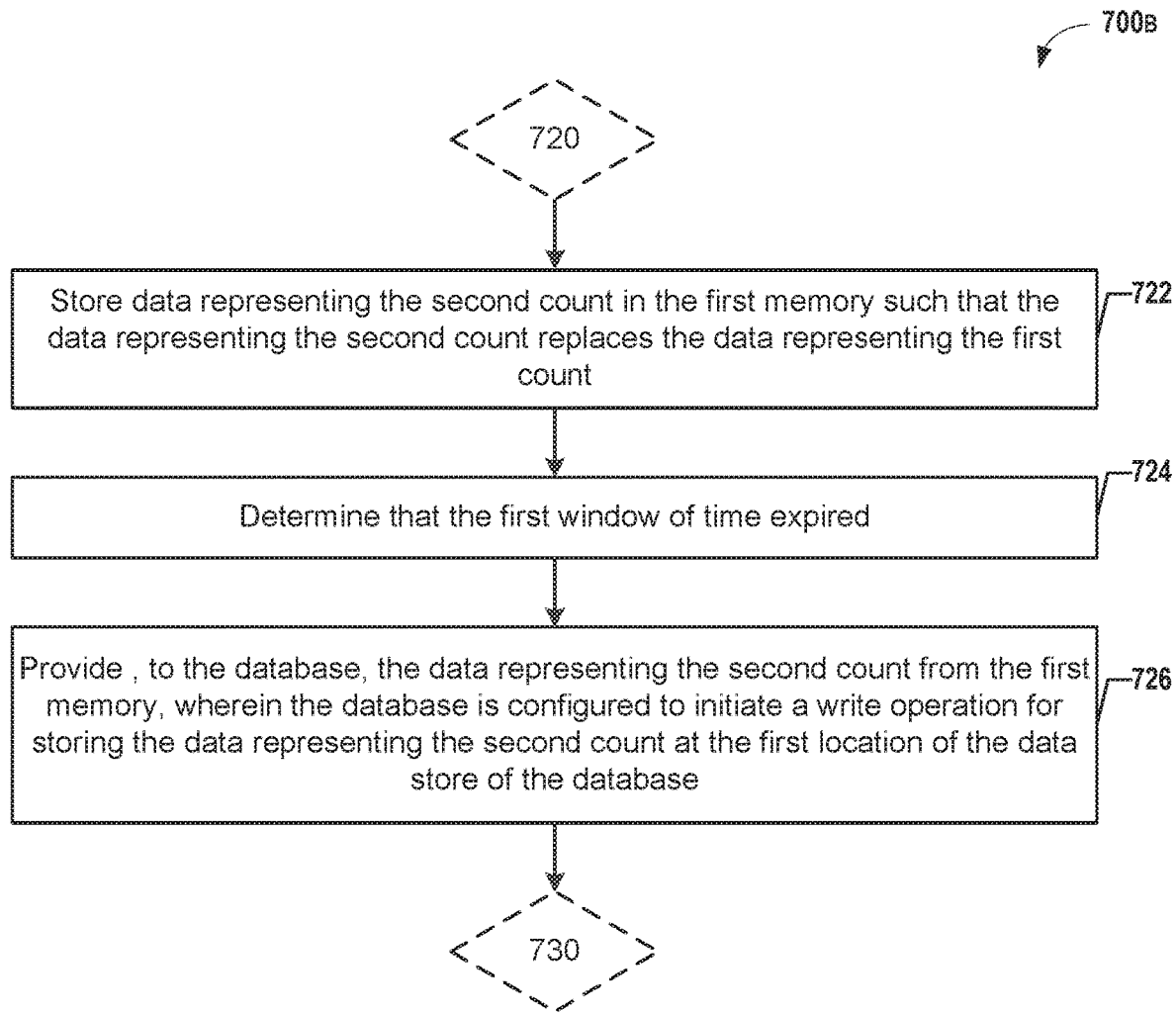
Figure 8A:
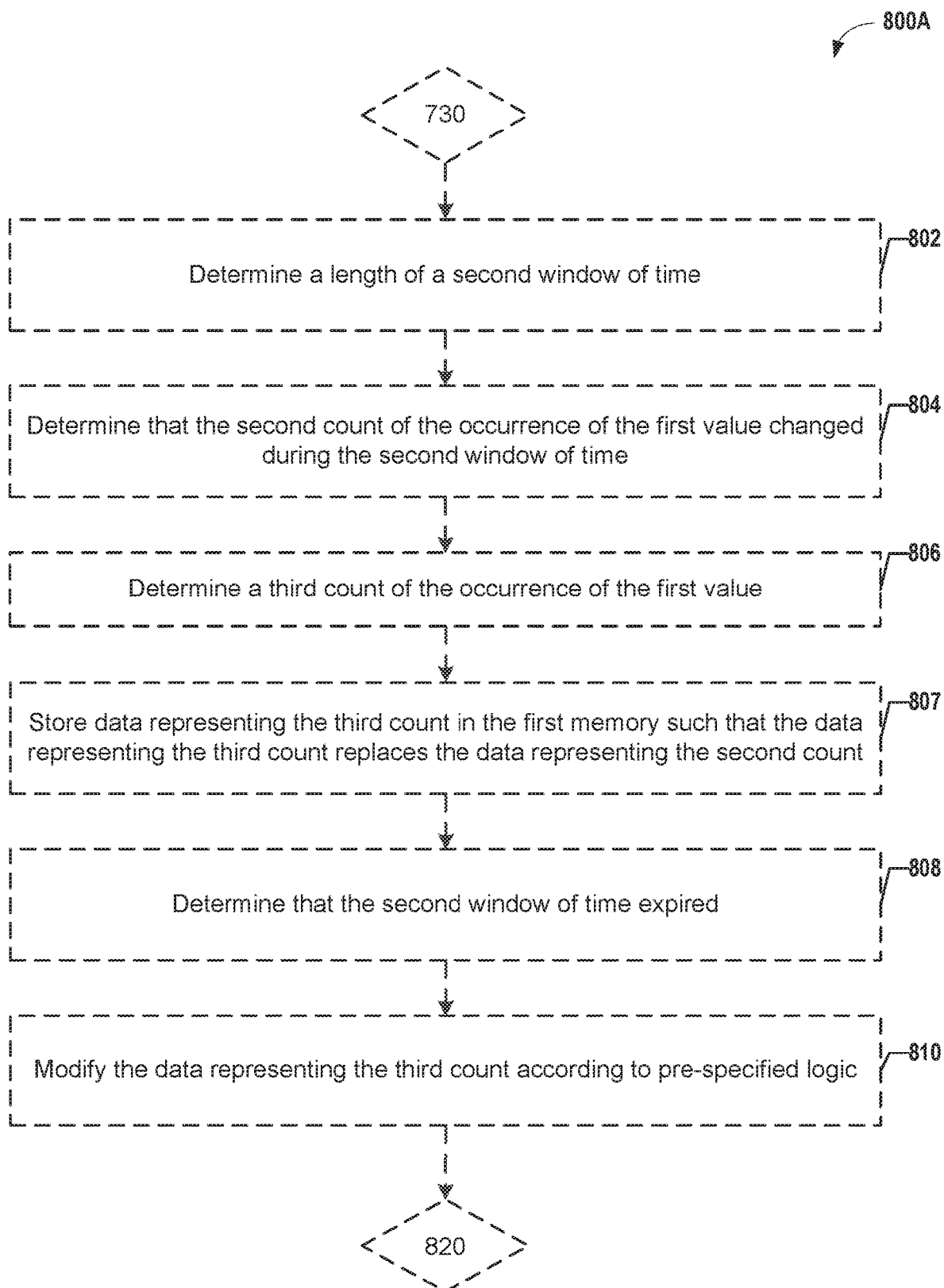
Figure 8B:
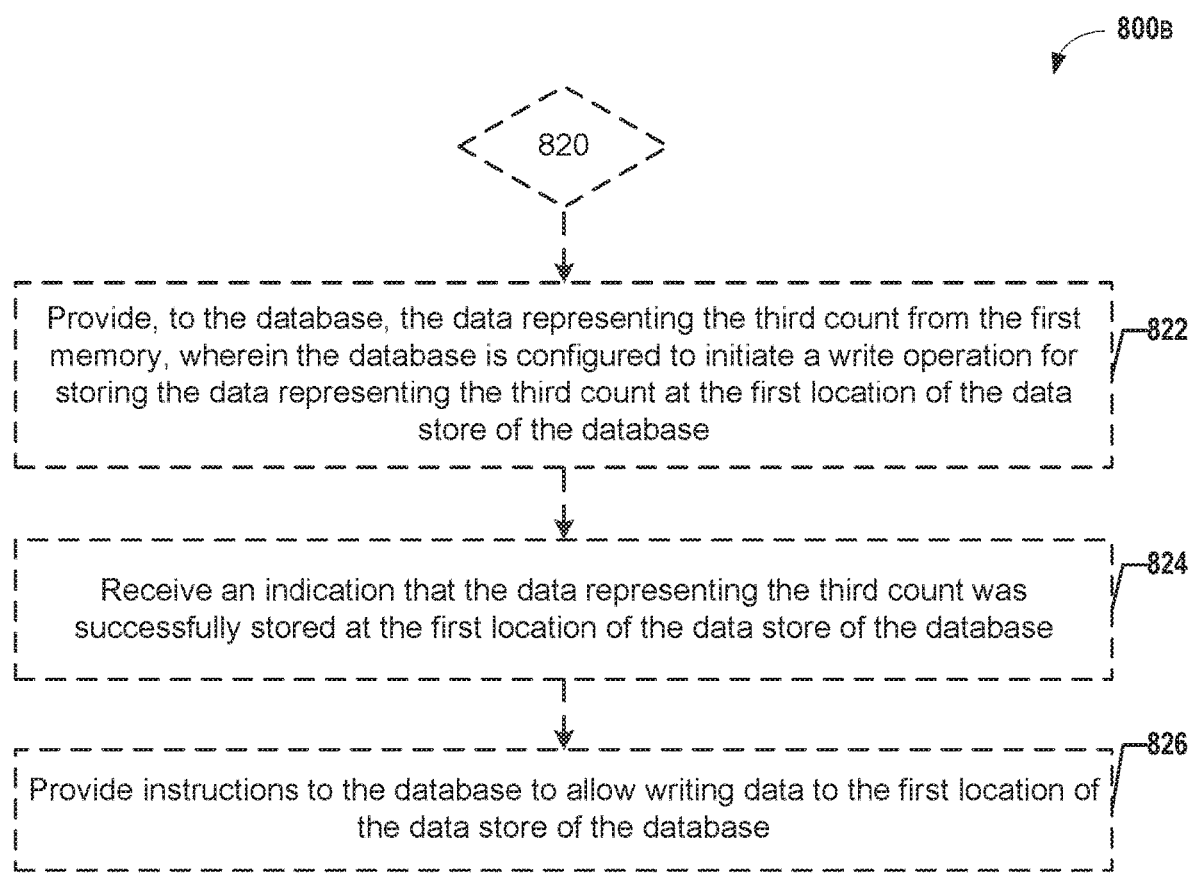

FIGS. 7A-7B are flowcharts illustrating example processes 700A and 700B that may be completed in accordance with various embodiments of the disclosure. The process 700A may begin with receiving, from a database, instructions to perform one or more data monitoring operations, wherein the data monitoring operations comprise counting an occurrence of a first value within at least a portion of items stored in the database (702). For example, a counting engine or a counter 102 may receive instructions to count one or more events associated with a retailer website. In one example, the counting engine or counter 102 may count the number of visitors to the retailer website. In one example, the counting engine or counter 102 may count the number of purchases made at the retailer website during a pre-specified period. In one example, the counting engine or the counter 102 may be responsible for counting a number of customers that currently added a particular product to their respective carts, a number of purchases of the particular product that used a particular promotion, and/or a number of customers currently in the waiting list to redeem the promotion.

The process 700A may continue with determining a length of a first window of time (704). For example, the window of time may be defined by a period T 124. During the period T 124 updates to the count may not be written to the database 106. In one implementation, the period T may be determined by the database 106 based on current computational load. In one implementation, the period T may be determined by the database 106 based on current heat levels of the database. In one example, the database 106 may provide data indicative of the length of the first window to the counter 102.

The process 700A may continue with fetching, from a first location of a data store of the database, data indicative of a total count of the occurrence of the first value at a time associated with the beginning of the first window of time (706). For example, the counter 102 may fetch data indicative of the current count of visitors to the retailer website from database 104 and/or hard disk 106. The process 700A may then continue with the optional step, shown phantom, of providing instructions to the database to prevent writing data to the first location of the data store of the database during the first window of time (708). For example, the counter 102 may provide data to database 104 to prevent the database 104 from writing data onto a portion of hard disk 106 designated for storing the count. This may prevent other counters from altering the count while the counter 102 is updating the count to maintain the integrity of the count.

The process 700A may continue with determining a first count of the occurrence of the first value based at least in part on the data indicative of the total count and changes in the total count of occurrence of the first value during the first window of time (710). For example, the counter 102 may determine that a first change in data associated with C1 110 occurred during the time window T 124. In turn, the counter 102 may determine an updated count based on the first change. The process 700A may continue with storing data representing the first count in a first memory (712). For example, the counter 102 may store the updated count in RAM 108.

The process 700A may continue with determining that the first count of the occurrence of the first value changed during the first window of time (714). The counter 102 may determine that a second change in data associated with C2 112 occurred after a first change in data associated with C1 110. In turn, the process 700 may continue with determining a second count of the occurrence of the first value (716). For example, the counter 102 may determine an updated count based on C2 112. The process 700 may continue to optional step 720 shown in phantom in FIGS. 7A-7B.

The process 700A may optionally continue with the process 700B of FIG. 7B. The process 700B may begin with storing data representing the second count in the first memory such that the data representing the second count replaces the data representing the first count (722). For example, the process 700B may continue with storing the updated count in RAM 108.

The process 700B may determine that the first window of time expired (724). For example, the counter 102 may determine that the first window of time expired or that the first period of time ended. In turn, the process 700B may continue with providing, to the database, the data representing the second count from the first memory, wherein the database is configured to initiate a write operation for storing the data representing the second count at the first location of the data store of the database (726). For example, in response to determining that the first window of time expired, the counter 102 may provide to database 104 the updated count (e.g., most recent count) for storage at hard disk 104. In one example, the updated count may be stored onto the portion of the hard disk 104 designated for storing the count. In one implementation, the updated count may replace a previous count stored at the same location. The process 700B may continue to optional step 730, shown in phantom.

The process 700B may optionally continue with the steps of process 800A. The process 800A may begin with determining a length of a second window of time (802). For example, the process 800A may determine the length of the window of time T 126. In one implementation the length of the second window of time is determined by the counter 102 based on the computational stress of the database 104. In one implementation, instructions comprising the length of the window of time are provided by database 104 to counter 102. In one implementation, the length of the first window of time is substantially equal to the length of the second window of time. In one implementation, the second window of time may be different in length from the first window of time.

The process 800A may continue with determining that the second count of the occurrence of the first value changed during the second window of time (804). The counter 102 may determine that a first change in data associated with C5 118 occurred. In turn, the process 800A may continue with determining a third count of the occurrence of the first value (806). For example, the counter 102 may determine an updated count based on C5 118. The process 800A may continue to optional step shown in phantom of storing data resenting the third count in the first memory such that the data representing the third count replaces the data representing the second count (807). For example, the counter may store the updated count into RAM 108.

The process 800A may continue with determining that the second window of time expired (808). For example, the counter 102 may determine that the window of time T2 308 expired or that the second period of time T2 ended. The process 800A may optionally continue with modifying the data respecting the third count according to pre-specified logic (810). For example, the logic device 310 may facilitate counting of data of composite data. Composite data may be data that is formed by multiple primitive data types. In one example, composite data may be data determined based on multiple double precision integers and Boolean values. For example, a website for the online retailer services may provide a limited number of coupons for redemption on first come first serve basis. The coupons may be for a particular product (e.g., 30-inch monitor). In one example, only the first thousand customers may be eligible to receive and/or redeem a coupon. Customers may be able to add items from the online retailer to a shopping cart. A limited number of customers (e.g., 100) may be allowed to be placed on a waiting list for the coupons while other customers are completing their transactions. Some customers may not complete their transaction. For example, a customer may empty his respective cart. Accordingly, a coupon reserved for that customer may be free to provide to a different customer from the waiting list. The logic device 310 may perform logical or mathematical operations to facilitate counting these example occurrences. In some implementations, the logic device 310 may provide instructions to counter 102 to increment and decrement the counters and/or sub-counters associated with the attributes above, as described herein.

The logic device 310 may enforce one or more strategies in association with the counts described above. In one example, a user device (not shown) may provide the one or more strategies to the logic device 310 and/or counter 102. In one example, the logic device 310 may provide instructions to the retail service to allow one or more additional user to join the waiting list and to allow one or more additional users to redeem a coupon. In one example, the logic device 310 may provide instructions to the retail service to now allow additional users to join the waiting list and to not allow additional users to redeem a coupon. The logic device may also perform operations to determine complex type counts Similar logic may also be implemented using logic device 310. As described herein, a user (e.g., employee of the retail service), may provide custom logic and strategies for implementation by logic device 310. In turn, the logic device 310 may enforce the custom logic and strategies provided. The process 800A may continue to optional step 820, shown in phantom.

The process 800A may optionally continue with the steps of process 800B. The process 800B may continue with providing, to the database, the data representing the third count from the first memory, wherein the database is configured to initiate a write operation for storing the data representing the third count at the first location of the data store of the database (822). For example, in response to determining that the second window of time expired, the counter 102 may provide to database 104 the updated count (e.g., third count) for storage at hard disk 106. In one example, the updated count may be stored onto the portion of the hard disk 106 designated for storing the count. In one implementation, the updated count may replace a previous count stored at the same location.

The process 800B may continue with receiving an indication that the data representing the third count was successfully stored at the first location of the data store of the database (824). For example, the database 104 may provide data indicative of updated count being successfully stored or written to hard disk 106. In turn, the process 800B may provide instructions to the database to allow writing data to the first location of the data store of the database (826). For example, in response to determining that the updated count was successfully stored onto database 104 and/or hard disk 106, the counter 102 may provide instructions to the database 104 to allow write operations to the portion of the hard disk designated for the count. As discussed herein, the write operations may be disabled when the counter 102 is updating the count. For example, a tuple and/or an item of the database designated for storing the count, may be locked during a time when counter 102 is updating the count. In one example, other counters different from counter 102 may not be permitted to modify the tuple or item when counter 102 is actively performing steps to update the count. After the update is complete, the counter 102 may provide instructions to the database to allow other counters to modify the tuple or item.

It should be understood that the processes, operations and functionality described above may be implemented in a plurality of systems. For example, the processes, operations and functionality above may be implemented in external and/or internal systems. Similarly, the processes, operations and functionality above may be implemented in a display device such as a television, monitor, laptop, table, mobile phone, gaming console and/or the like.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory, extended memory or any combination thereof. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for controlling use of read and write operations in a database that stores one or more time varying counter values, the method comprising:
   receiving, by one or more computer processors coupled to memory, a request associated with a read operation for one or more time varying counters to fetch the one or more time varying counter values that are stored in one or more locations of the database;
   determining a time value of a timer associated with the one or more time varying counters;
   preventing data from being written to the one or more locations of the database during the time value;
   determining an update associated with the one or more time varying counter values, wherein the update includes a counter value fetched from a first memory;
   storing data representing the update at a local memory associated with the one or more time varying counters based at least in part on a determination that the time value of the timer has not expired; and
   initiating, at the database, a write operation for storing data representing the update at the one or more locations of the database based at least in part on a determination that the time value of the timer has expired.

2. The method of claim 1, further comprising adjusting the one or more time varying counter values based at least in part on a processing load.

3. The method of claim 1, wherein preventing data from being written to the one or more locations of the database during the time value comprises:

preventing data associated with one or more additional time varying counters from being written to the one or more locations of the database during the time value.

4. The method of claim 1, wherein a first time varying counter value of the one or more time varying counter values and a first update to the first time varying counter value are associated with a first location of the one or more locations of the database, and a second time varying counter value of the one or more time varying counter values and a second update to the second time varying counter value are associated with a second location of the one or more locations of the database.

5. The method of claim 1, further comprising:
determining a combined value based at least in part on the update; and
initiating, at the database, a write operation for storing data representing the combined value at the one or more locations of the database.

6. The method of claim 1, further comprising:
receiving an additional request associated with an additional read operation for the one or more time varying counters to fetch one or more additional time varying counter values that are stored in one or more additional locations of the database;
determining an additional time value of the timer;
preventing data from being written to the one or more additional locations of the database during the additional time value;
determining an additional update associated with the one or more additional time varying counter values;
storing data representing the additional update at the local memory based at least in part on a determination that the additional time value of the timer has not expired; and
initiating, at the database, a write operation for storing data representing the additional update at the one or more additional locations of the database based at least in part on a determination that the additional time value of the timer has expired.

7. The method of claim 6, further comprising:
determining a combined value based at least in part on the update and the additional update; and
initiating, at the database, a write operation for storing data representing the combined value at the one or more locations of the database.

8. The method of claim 1, further comprising:
determining an additional time value of the timer;
determining an additional update with the one or more time varying counter values;
storing data representing the additional update at the local memory based at least in part on a determination that the additional time value of the timer has not expired; and
initiating, at the database, a write operation for storing data representing the additional update at the one or more locations of the database based at least in part on a determination that the additional time value of the timer has expired.

9. The method of claim 8, wherein the time value and the additional time value are consecutive.

10. The method of claim 8, wherein at least a portion of the time value overlaps with the additional time value.

11. A system for controlling use of read and write operations in a database that stores one or more time varying counter values, the system comprising:
one or more time varying counters configured to read one or more time varying counter values from one or more locations of a database and to write the one or more time varying counter values to one or more locations; and
a local memory associated with the one or more time varying counters, the local memory implementing a timer, wherein the timer comprises logic to:
receive a request associated with a read operation for the one or more time varying counters to fetch the one or more time varying counter values;
determine a time value of the timer associated with the one or more time varying counters;
permit other data to be written to other locations of the database during the time value;
determine an update with the one or more time varying counter values, wherein the update includes a counter value fetched from a first memory;
store data representing the update at the local memory based at least in part on a determination that the time value of the timer has not expired; and
initiate, at the database, a write operation for storing data representing the update at the one or more locations of the database based at least in part on a determination that the time value of the timer has expired.

12. The system of claim 11, wherein the timer further comprises the logic to adjust the one or more time varying counter values based at least in part on a processing load.

13. The system of claim 11, wherein preventing data from being written to the one or more locations of the database during the time value comprises:
preventing data associated with one or more additional time varying counters from being written to the one or more locations of the database during the time value.

14. The system of claim 11, wherein a first time varying counter value of the one or more time varying counter values and a first update to the first time varying counter value are associated with a first location of the one or more locations of the database, and a second time varying counter value of the one or more time varying counter values and a second update to the second time varying counter value are associated with a second location of the one or more locations of the database.

15. The system of claim 1, wherein the timer further comprises logic to:
determine a combined value based at least in part on the update; and
initiate, at the database, a write operation for storing data representing the combined value at the one or more locations of the database.

16. The system of claim 11, wherein the timer further comprises the logic to:
receive an additional request associated with an additional read operation for the one or more time varying counters to fetch one or more additional time varying counter values that are stored in one or more additional locations of the database;
determine an additional time value of the timer;
prevent data from being written to the one or more additional locations of the database during the additional time value;
determine an additional update associated with the one or more additional time varying counter values;
store data representing the additional update at the local memory based at least in part on a determination that the additional time value of the timer has not expired; and initiate, at the database, a write operation for storing data representing the additional update at the one or more additional locations of the database based at least in part on a determination that the additional time value of the timer has expired.

17. The system of claim 16, wherein the timer further comprises the logic to:
   determine a combined value based at least in part on the update and the additional update; and
   initiate, at the database, a write operation for storing data representing the combined value at the one or more locations of the database.

18. The system of claim 11, wherein the timer further comprises the logic to:
   determine an additional time value of the timer;
   determine an additional update with the one or more time varying counter values;
   store data representing the additional update at the local memory based at least in part on a determination that the additional time value of the timer has not expired; and
   initiate, at the database, a write operation for storing data representing the additional update at the one or more locations of the database based at least in part on a determination that the additional time value of the timer has expired.

19. The system of claim 18, wherein the time value and the additional time value are consecutive.

20. The system of claim 18, wherein at least a portion of the time value overlaps with the additional time value.

* * * * *